(12) United States Patent
Fichter

(10) Patent No.: US 8,985,606 B2
(45) Date of Patent: Mar. 24, 2015

(54) MOVEABLE STEP FOR ASSISTING ENTRY INTO VEHICLES

(76) Inventor: Thomas Fichter, Houston, TX (US)

( * ) Notice: Subject to any disclaimer, the term of this patent is extended or adjusted under 35 U.S.C. 154(b) by 0 days.

(21) Appl. No.: 13/411,694

(22) Filed: Mar. 5, 2012

(65) Prior Publication Data

US 2012/0228848 A1 Sep. 13, 2012

Related U.S. Application Data

(60) Provisional application No. 61/450,736, filed on Mar. 9, 2011.

(51) Int. Cl.
*B60R 3/00* (2006.01)
*B60R 9/02* (2006.01)

(52) U.S. Cl.
CPC . *B60R 3/00* (2013.01); *B60R 3/002* (2013.01); *B60R 9/02* (2013.01)
USPC .......................... 280/163; 280/164.1; 280/166

(58) Field of Classification Search
CPC .......... B60R 3/002; B60R 3/00; B60R 3/007; B60R 9/00; B60R 9/06; E06C 5/00
USPC .............. 280/163, 164.1, 166, 32.5; 248/243, 248/250, 317, 320, 323, 327, 342; 108/144.11, 147.12, 147.13, 147.18, 108/147.17; 182/90
See application file for complete search history.

(56) References Cited

U.S. PATENT DOCUMENTS

| | | | | |
|---|---|---|---|---|
| 415,789 | A | * | 11/1889 | Pendergast ........................ 182/90 |
| 810,199 | A | * | 1/1906 | Erret ................................ 182/90 |
| 845,803 | A | * | 3/1907 | Manross .......................... 182/90 |
| 1,043,715 | A | | 11/1912 | Mitchell |
| 1,212,572 | A | | 1/1917 | Sheridan |
| 2,559,123 | A | | 7/1951 | Jackson |
| 2,678,832 | A | | 5/1954 | Wright |
| 3,210,110 | A | | 10/1965 | Chieger |
| 3,862,670 | A | | 1/1975 | Hovey |
| 3,980,319 | A | * | 9/1976 | Kirkpatrick ................... 280/166 |
| T977,005 | I4 | | 12/1978 | Sidles, Jr. |
| 4,200,303 | A | | 4/1980 | Kelly |
| 4,231,583 | A | * | 11/1980 | Learn ............................ 280/166 |
| 4,333,547 | A | | 6/1982 | Johansson |
| 4,610,458 | A | | 9/1986 | Garnham |
| 4,639,032 | A | | 1/1987 | Barbour |
| D293,667 | S | | 1/1988 | Weiler |
| 4,926,965 | A | | 5/1990 | Fox |

(Continued)

FOREIGN PATENT DOCUMENTS

| | | |
|---|---|---|
| EP | 0173227 | 3/1986 |
| EP | 0210465 | 2/1987 |
| WO | 88/03882 | 6/1988 |

*Primary Examiner* — J. Allen Shriver, II
*Assistant Examiner* — Steve Clemmons

(57) ABSTRACT

A side bar and steps attached to the side bar attached to a vehicle or to the side of the vehicle by welds, brazing, or bolting to brackets welded to the side bar or vehicle. A step is constructed by attaching a curved or flat member to the top of an L-shaped support bar that is in turn connected to the side bar or vehicle. The steps are movably affixed to a tab that is welded to the side bar or vehicle. The L-shaped supports have a plurality of engagement points so that the step can be adjusted upward and downward using the different attachment points. In this manner steps can be moved for different users depending on the height of the vehicle or user preference. The L-shaped support bars may be flared outward and provided with a plate for mounting the step thereon.

20 Claims, 5 Drawing Sheets

(56) References Cited

U.S. PATENT DOCUMENTS

| | | | |
|---|---|---|---|
| 4,935,638 A * | 6/1990 | Straka | 280/164.1 |
| 4,943,085 A | 7/1990 | Straka | |
| D316,394 S * | 4/1991 | Carr | D12/203 |
| 5,046,582 A | 9/1991 | Albrecht | |
| 5,137,293 A | 8/1992 | Graves et al. | |
| 5,193,829 A | 3/1993 | Holloway et al. | |
| 5,255,757 A | 10/1993 | Horowitz et al. | |
| 5,286,049 A * | 2/1994 | Khan | 280/163 |
| 5,620,059 A * | 4/1997 | Crispeno | 182/127 |
| 5,732,996 A | 3/1998 | Graffy et al. | |
| 5,895,064 A * | 4/1999 | Laubach | 280/163 |
| 6,017,045 A | 1/2000 | Dermody | |
| D437,818 S | 2/2001 | Mothersele | |
| D440,931 S * | 4/2001 | Knight et al. | D12/203 |
| 6,375,207 B1 * | 4/2002 | Dean et al. | 280/166 |
| 6,422,342 B1 | 7/2002 | Armstrong et al. | |
| 6,435,534 B1 | 8/2002 | Stone | |
| 6,536,790 B1 * | 3/2003 | Ojanen | 280/163 |
| 6,588,783 B2 | 7/2003 | Fichter | |
| 6,840,526 B2 | 1/2005 | Anderson et al. | |
| 6,874,801 B2 | 4/2005 | Fichter | |
| 6,986,523 B1 * | 1/2006 | Bickford | 280/414.1 |
| D532,354 S | 11/2006 | Storer | |
| D546,745 S | 7/2007 | Storer | |
| D568,222 S | 5/2008 | Storer | |
| 7,416,202 B2 | 8/2008 | Fichter | |
| 7,717,444 B2 | 5/2010 | Fichter | |
| 7,909,344 B1 * | 3/2011 | Bundy | 280/163 |
| 2009/0014978 A1 * | 1/2009 | Shumway | 280/166 |

* cited by examiner

MOVEABLE STEP FOR ASSISTING ENTRY INTO VEHICLES

CROSS REFERENCE TO RELATED APPLICATIONS

This application takes priority for a provisional application for patent bearing Ser. No. 61/450,736 filed Mar. 9, 2011 entitled "An apparatus for assisting entry into high road clearance vehicles" and is incorporated by reference as if fully set forth herein.

STATEMENT REGARDING FEDERALLY SPONSORED RESEARCH OR DEVELOPMENT

Not applicable

BACKGROUND OF THE INVENTION

This invention relates generally to the field of vehicle accessories, and more particularly to automotive side steps for assisting entry into vehicles.

The present invention relates in general to vehicle side bars for sport utility vehicles, pick-up trucks, jeeps, sedans and similar vehicles.

A vehicle side bar is an accessory which has gained considerable popularity in recent years. In essence, it is a wide tubular bar which is attached to the side of a vehicle just below the passenger cab. It usually covers the length of the cab and projects laterally to the outside of the cab side or door surface or is suspended from the chassis outward from the vehicle. It is usually bolted or welded to the main longitudinal frame beam of the vehicle chassis.

The side bar is both an appearance accessory and provides some protection for door and side of the vehicle cab to deflect debris.

Many vehicles of earlier date had running boards along the side of the vehicle to provide a stable platform to stand on and assist in entry and exit from the vehicle. More recently, side bars have been manufactured and sold, primarily by small and large automotive accessory companies. Side bars, while primarily a styling accessory, have been modified to provide a step built into the side bar to assist in entry of and exit from the vehicle. The side bar system of the present invention, in contrast with side bars of the prior art enable vertical movement of a step that is variably affixed to the side bar that provides a a stable step closer to the ground.

Four wheel drive vehicles are intentionally designed with a relatively high road clearance, that is the frame and body is supported at a relatively high distance from the ground. This is a desired characteristic, since the user of the vehicles wants the maximum clearance for traversing adverse road conditions such as deep snow, muddy and rutted roads and the like. Additionally, four wheel drive vehicles are often driven off improved roadways where all types of conditions are likely to be encountered.

One of the problems with a high clearance vehicle is the height of the entry into the passenger compartment. The floor of the passenger cab is of necessity high above the ground and, for many individuals, the required "step" is too high to permit easy entry.

Side bars such as those similar to and described in U.S. Pat. No. 4,935,638 provide a step on the side bar itself. This step is many times still too high off the ground to permit easy entry into the vehicle. Aesthetically, a step built into the side bar also visually disrupts the clean line and streamlined appearance of the bar. Other side bars are permanently affixed to the side bar and do not permit adjustment for different users. Still other side bars and steps have hoop configurations that require two points of attachment to the side bar and may not be aesthetically pleasing to some users.

BRIEF SUMMARY OF THE INVENTION

The primary advantage of the invention is to assist entry into the vehicle passenger compartment.

Another advantage of the invention is to provide an intermediate step between the ground and the floor of the passenger compartment.

Another advantage of the invention is to provide a stylish appearance accessory to vehicle.

A further advantage of the invention is to provide a functional side step and/or a protective device for the door and side of the vehicle cab.

Yet another advantage is to provide a moveable step that can be easily lowered and raised to different heights.

Other objects and advantages of the present invention will become apparent from the following descriptions, taken in connection with the accompanying drawings, wherein, by way of illustration and example, an embodiment of the present invention is disclosed.

The side bar is mounted onto the vehicle chassis by means of mounting brackets which attach to the chassis and the side bar by a variety of conventional means including but not limited to welds, brazing or attachment with nuts and bolts. This may be done directly to the chassis or through intermediate brackets or other points of attachment to the vehicle.

The steps are attached to the side bar or vehicle by welds, brazing, or preferably bolting to brackets welded to the side bar or vehicle. A step is constructed by attaching a flat member to the top of an L-shaped support bar that is in turn connected to the side bar or vehicle. This configuration is the step assembly. An additional lower step can be constructed by using another set of L-shaped support bars and attaching it to the side bar. The steps are bolted to a tab that is welded to the side bar or vehicle. The L-shaped supports have a plurality of engagement points so that the step can be adjusted upward and downward using the different attachment points. In this manner steps can be moved for different users depending on the height of the vehicle or user preference.

The composition of the support bars and flat section can be metal or any of a number of high strength composite materials. The finish of the bars can be but is not limited to chrome, polished metal or high or low gloss paint to complement the appearance of the vehicle.

In accordance with a preferred embodiment of the invention, there is shown an apparatus for assisting entry into vehicles having a generally elongate side bar adapted for horizontal attachment to a vehicle wherein the bar is fixedly attached to a side of the vehicle along a longitudinal axis of the vehicle, a generally L-shaped support moveably attached to the side bar; and a step fixedly attached to the L-shaped support for stable engagement.

In accordance with a preferred embodiment of the invention, there is shown an apparatus for assisting entry into vehicles having a generally cylindrical side bar adapted for horizontal attachment to a vehicle wherein the bar is fixedly attached to a side of the vehicle along a longitudinal axis of the vehicle, a pair of generally L-shaped supports moveably attached to the side bar for generally vertical movement about the bar, a generally flat plate fixedly attached to the L-shaped supports; and a step fixedly attached to the plate.

In accordance with a preferred embodiment of the invention, there is shown an apparatus for assisting entry into vehicles having a generally cylindrical side bar adapted for horizontal attachment to a vehicle wherein the bar is fixedly attached to a side of the vehicle along a longitudinal axis of the vehicle, a support and step assembly moveably attached to the vehicle, where the support and step assembly is comprised of two vertical extensions with a plurality of engagement holes for stable engagement to the vehicle, and a step fixedly mounted to the vertical extensions.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiments are provided herein. It is to be understood, however, that the present invention may be embodied in various forms. Various aspects of the invention may be inverted, or changed in reference to specific part shape and detail, part location, or part composition. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
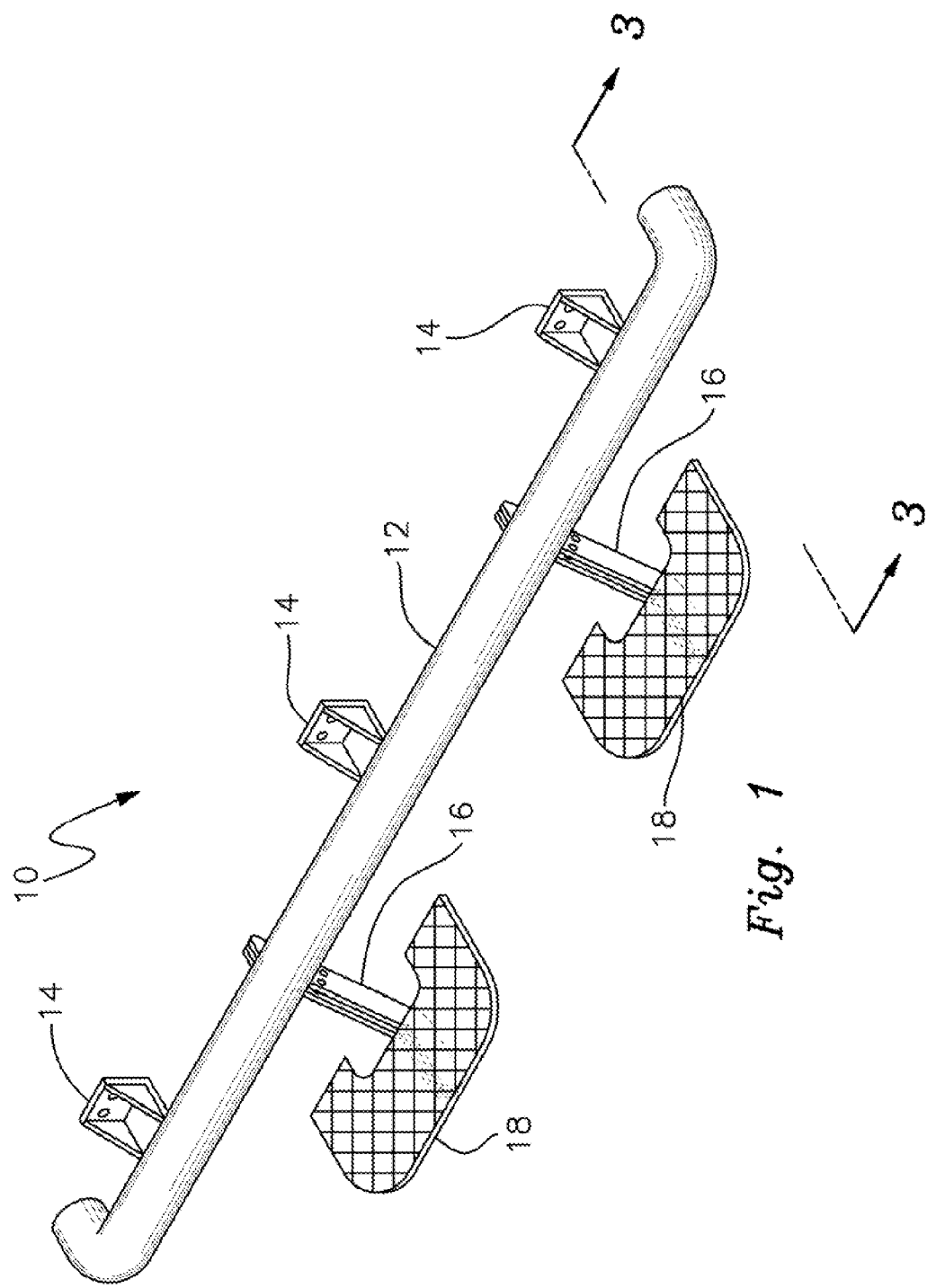
FIG. 1 is a perspective view of a side bar and steps according to a preferred embodiment of the invention.

FIG. 1 shows a perspective view of a side bar and step assembly configuration 10 according to a preferred embodiment of the invention. Side bar 12 may be affixed to the chassis of the vehicle through a variety of conventional means including bolts, welding, brazing, or other bracketing. Side bar 12 may be an elongate member of any of a variety of generally cylindrical shapes having a cross section of any polygonal shape. It may be a hollow tube, solid or partially solid. FIG. 1 shows brackets 14 that may be affixed to the chassis of the vehicle with bolts. L-shaped supports 16 are affixed to side bar 12 at an approximate 45 degree angle, although it may be any of a variety of angles. The method of attachment of L-shaped supports 16 may be of any a variety of that permits moveable attachment. L-shaped supports 16 are shown as a two part L-shaped configuration for support of a step 18, although in alternative embodiments a step may be supported by a single L-shaped extension attached to side bar 12. Step 18 is affixed to L-shaped supports 16 to provide stable support for step 18. This may be accomplished in any of a number of ways including bolting, welding, brazing, riveting or other means so long as step 18 is relatively stably attached. Step 18 is shown as generally flat but may be of any a variety of shapes including having upturned edges, curved or varied across its surface with peaks and valleys.

In an alternative embodiment, step 18 may be moveably attached to L-shaped supports 16 and fixed in different positions on L-shaped supports 16.

Figure 2:
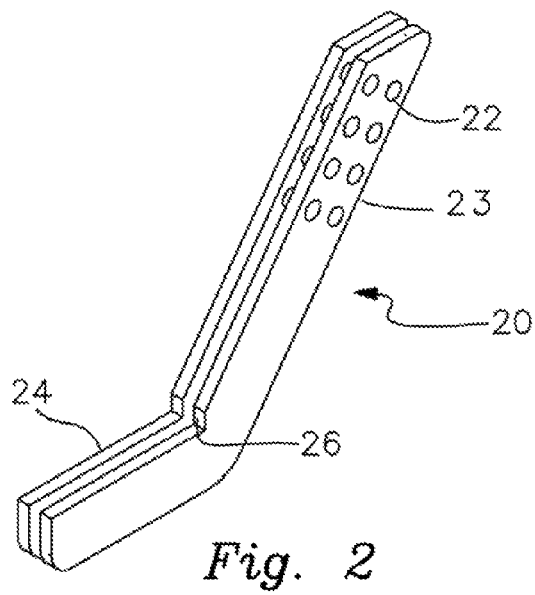
FIG. 2 is a pair of L-shaped support bars showing a plurality of attachment points for engagement to the side bar according to a preferred embodiment of the invention.

FIG. 1 shows two steps but it is within the scope of the invention to employ one or more steps. Each support and step assembly comprised of L-shaped supports 16 and step 18 are affixed to the side bar as more fully described below. The flat portion of step 18 may be made of a slip resistant material, or may be configured with scoring on the metal to provide a slip resistant surface. Alternatively, the flat portion of step 18 may employ a raised or reverse dimple die for slip resistance. L-shaped support 20 is comprised of a vertical upper portion 23 and a horizontal lower portion 24. The step 18 may be affixed to the L-shaped supports 20 directly on horizontal lower portion 24 as shown in FIG. 2 by welding, brazing or other means so long as the step is fixedly attached in a stable manner. Notch 25 may be provided to engage the inside edge of step 18 for stable engagement to horizontal portion 24 on L-shaped supports 20. L-shaped supports 20 are configured with voids 22 for engagement of bolts to affix L-shaped supports 20 to side bar 12 as more fully described in FIG. 3. In alternative embodiments, the step may be removably attached to the L-shaped supports 20.

In an alternative embodiment, supports 20 may be generally elongate without any right angle extension. Rather, the step and support would be combined to form an L-shape with the extended horizontal portion of the L being the step itself.

Figures 2A, 2B:
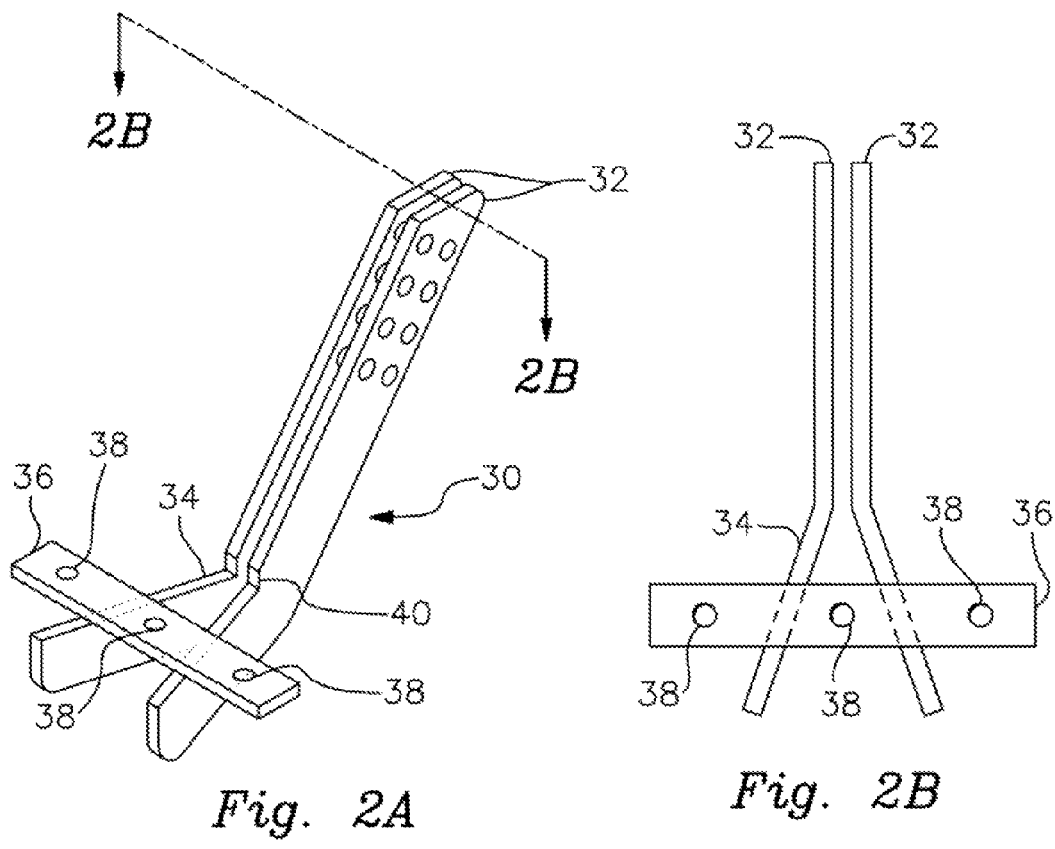
FIG. 2A is a pair of alternative L-shaped support bars having flared extension and showing a plurality of attachment points for engagement to the side bar according to a preferred embodiment of the invention.
FIG. 2B is a plan view along 2B-2B of the alternative L-shaped support bars of FIG. 2A.

In alternative embodiments shown in FIGS. 2A and 2B, a support plate 36 may be attached to the L-shaped support by welding, brazing or other means to permit support of a step to the plate via holes 38 in support plate 36. Notch 40 may be configured to provide additional stable support for a step, although it is not necessary. Horizontal portion 34 supports plate 36. L-shaped supports 32 are affixed to a tab extending from side bar 12 as more fully described below. In an alternative embodiment, as shown in FIGS. 2A and 2B, the ends of L-shaped supports 32 may be flared outward rather than being parallel as shown in FIG. 2. The shape of L-shaped supports 20 or 32 may be partially curved on the vertical portions attached to the side bar but generally should be sufficient to extend the step away from the side of the vehicle and be able to support a step in some stable manner.

Figure 3:
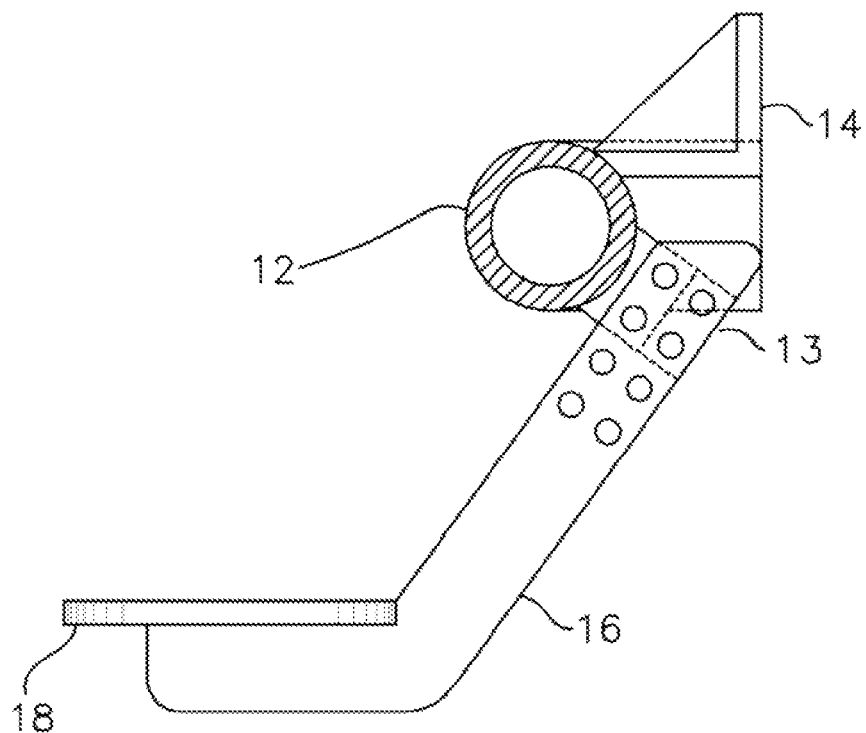
FIG. 3 is a cross section view along 3-3 of FIG. 1 showing attachment of the step to the side bar according to a preferred embodiment of the invention.

FIG. 3 shows a cross sectional view of FIG. 1 along 3-3. The L-shaped support 16 has a plurality of engagement holes for attachment to the side bar or chassis of the vehicle. FIG. 3 shows four holes but any of a variety of configurations may be employed to allow for variable attachment of the step 18 assembly to the side bar 12 or chassis. Holes may be arranged as shown in two rows in certain embodiments or other configurations. Alternatively, the step assembly may be affixed to a bracket 14 attached to the side bar or the chassis. In the preferred embodiment, the two L-shaped supports 16 are affixed to the step 18 in such a manner as to create a gap between them for attachment to a single tab 13 mounted on the side bar 12.

In this embodiment, each L-shaped support 16 sandwiches a tab 13 on the side bar 12 and are affixed with bolts, or other removable mounting means. FIG. 3 shows tab 13 having four holes that match with four of the holes on L-shaped support 16. Through each hole a bolt or other suitable fastener may be affixed to firmly hold the L-shaped support to side bar 12. In this embodiment, the support members would be very close to each other and present a narrow appearance from the front. In the embodiment shown, the L-shaped support 16 would be welded to the step 18 and then bolted to the side bar tab 13 located along the side bar 12 wherever desired. Alternatively, the L-shaped supports 16 could be positioned closely together and positioned between two tabs located on the chassis or side bar 12 and affixed to the tabs with bolts or other conventional means.

As can readily been seen, the L-shaped support 16 may be moved up or down and affixed to tab 13 via any group of engagement holes on L-shaped support 16. In this manner, the step 18 can be moveably resituated on the side bar 12 to present a higher or lower position. By including more engagement holes on L-shaped support 16, the step 18 may be moved very close to the side bar 12 or fully extended as shown in FIG. 3. The L-shaped support may be vertically variably adjustable through any of a variety of mechanisms well know in the art, including cotter pins, ratcheting teeth, gears, hook and hanger, and any other moveable attachment mechanism. Alternatively, the L-shaped support may be moveably attached to the vehicle chassis.

In an alternative embodiment, if the tab 13 is affixed to the chassis of the car, the only limitation of retraction of the step 18 would be space sufficient to permit the L-shaped support 16 to tuck under the vehicle. Conversely, a longer L-shaped support 16 with either farther spaced holes or more holes would permit extension of the step 18 further downward depending on user preference.

Figure 4:
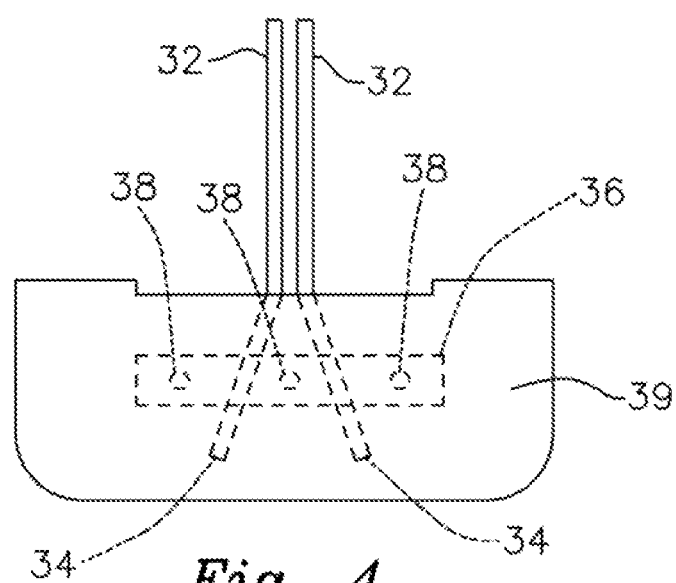
FIG. 4 is a plan view of an alternative L-shaped support bar with support plate according to a preferred embodiment of the invention.

FIG. 4 shows a plan view of L-shaped supports 32 that are flared outward and affixed to support plate 36. Step 39 is bolted to plate 36 at holes 38 for stable engagement of step 39 to L-shaped supports 32. The L-shaped supports 32 are then attached to side bar 12 as previously described.

Figure 5:
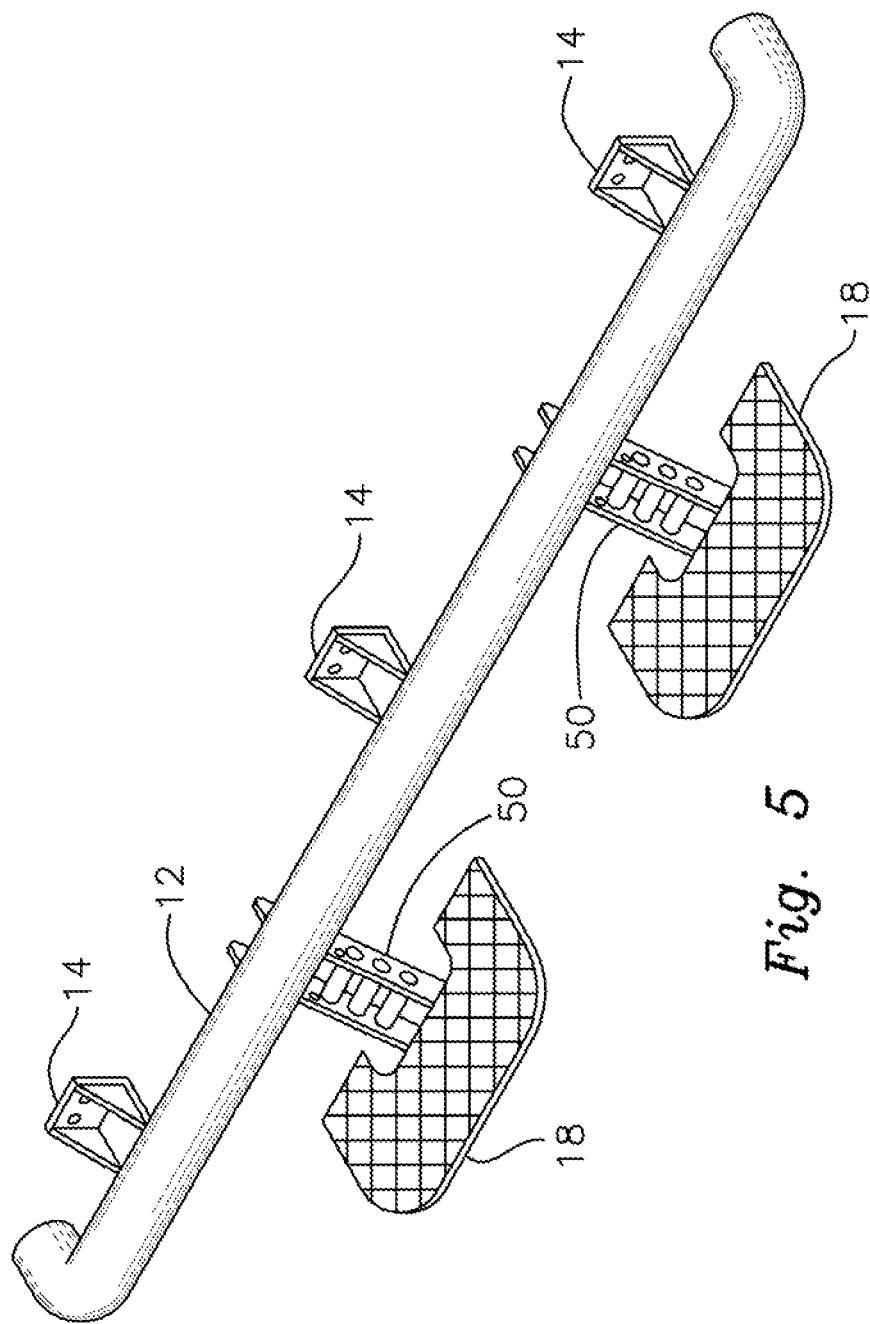
FIG. 5 is an alternative embodiment of L-shaped supports affixed to the side bar according to a preferred embodiment of the invention.
Figure 6:
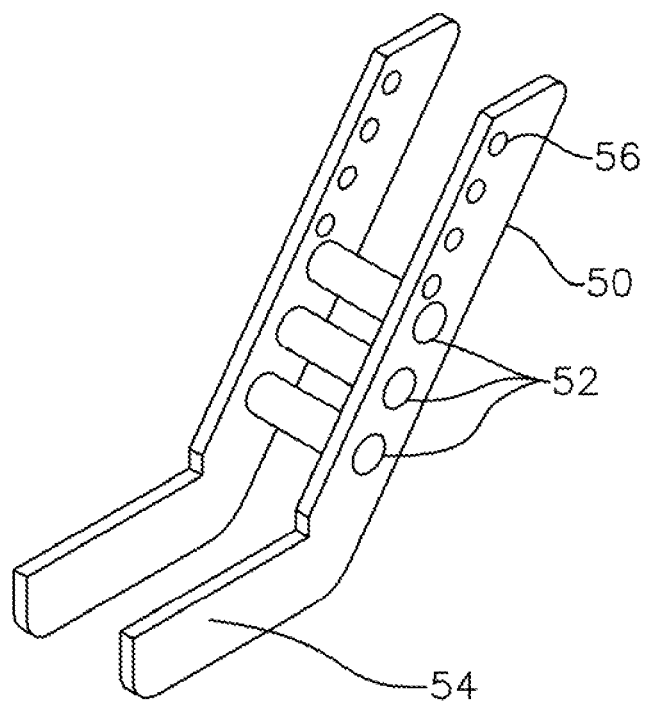
FIG. 6 is an alternative embodiment of L-shaped supports with cross posts according to a preferred embodiment of the invention.

FIG. 5 shows an alternative embodiment of L-shaped supports 50 with cross bars 52 shown in FIG. 6. Cross bars 52 provide added support for the step assembly and the step 18 that is mounted to the L-shaped supports 50. The step assembly may be affixed to a single tab on the side bar or chassis having mounting holes that mate with the holes on each L-shaped support 50 as previously described in FIG. 3. Alternatively, each L-shaped support 50 of a single step assembly could be matably engaged to one of two tabs aligned with the upper portion of the L-shaped supports 50. Any of a variety of attachment means may be employed including nuts and bolts, cotter pins, or a combination of the two. The support may be removably attached so as to permit movement of the support to different locations along the side bar upward and downward.

The side bar tab may also be moveably mounted on the side bar 12 by using an engagement that can be changed along the side bar 12. For example, it could have a flange with bolting mounts to pre-drilled holes along the inside of the side bar 12. Alternatively, the mounting tab could be affixed to a bracket that slides in a groove on the inside of the side step that permits the bracket to be located along the lengthy of the side bar 12. It would then in turn be affixed in the desired location and then bolted to the L-shaped supports which in turn are connected or affixed to the step. Similarly, the chassis could have a number of engagement points. Typically, the step assembly will be oriented at a convenient location near the door opening of the vehicle and may be affixed to the side bar 12 with a bracket or tab that is welded to the side bar 12 or along the chassis.

FIG. 6 shows a perspective view of a support comprised of two L-shaped supports 50. The two L-shaped supports 50 are connected in this embodiment by cross bars 52 for added strength. In this embodiment cross bars 52 create a space between the two supports to permit attachment of each support to a bracket or tab welded or otherwise attached to the side bar 12. In another embodiment, the supports may be affixed directly to the chassis via tabs or single bracket and still provide the benefits of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the issued claims.

The invention claimed is:

1. An apparatus for assisting entry into vehicles comprising:
   a. A generally elongate side bar adapted for horizontal attachment to a vehicle wherein said bar is fixedly attached to a side of the vehicle along a longitudinal axis of the vehicle;
   b. A step assembly comprising a pair of generally L-shaped supports fixedly attached to opposite sides of a planar tab said supports attached perpendicular to said longitudinal axis to said side bar said assembly attached at one of a plurality of discrete mounting locations on said tab to permit variable axial movement in a generally diagonal direction and a step fixedly attached to said L-shaped supports for stable engagement without engagement of said L-shaped supports directly to said vehicle chassis.

2. The apparatus for assisting entry into vehicles as claimed in claim 1 wherein said step is generally flat.

3. The apparatus for assisting entry into vehicles as claimed in claim 1 further comprising a support plate fixedly attached to said L-shaped supports for mounting of said step.

4. The apparatus for assisting entry into vehicles as claimed in claim 1 wherein said L-shaped support is comprised of two planar L-shaped members.

5. The apparatus for assisting entry into vehicles as claimed in claim 1 further comprising a plurality of engagement holes in said L-shaped supports each for receipt of a fastener.

6. The apparatus for assisting entry into vehicles as claimed in claim 1 wherein said L-shaped supports are mountable to a tab extended from said bar wherein said tab has a plurality of mounting locations.

7. An apparatus for assisting entry into vehicles comprising:
   a. A generally cylindrical side bar adapted for horizontal attachment to a vehicle wherein said bar is fixedly attached to a side of the vehicle along a longitudinal axis of the vehicle;
   b. A pair of generally L-shaped planar supports attached to said side bar for generally vertical movement about said bar;
   c. A generally flat plate fixedly attached to said L-shaped supports; and
   d. A step fixedly attached to said plate wherein said L-shaped supports, said plate and said step are variably attached to said side bar at one of a plurality of mounting locations on a planar tab mounted perpendicular to said longitudinal axis of said side bar which move as an assembly in a generally diagonal axial direction relative to said vehicle, wherein said L-shaped supports are not engaged directly to said vehicle.

8. The apparatus for assisting entry into vehicles as claimed in claim 7 further comprising mating engagement holes in said plate for insertion of fasteners.

9. The apparatus for assisting entry into vehicles as claimed in claim 7 further comprising scoring on said step.

10. The apparatus for assisting entry into vehicles as claimed in claim 7 further comprising a non-skid surface on said step.

11. The apparatus for assisting entry into vehicles as claimed in claim 7 further comprising a tab having a plurality of mounting locations on said side bar for engagement of said L-shaped supports.

12. The apparatus for assisting entry into vehicles as claimed in claim 7 further comprising a plurality of holes on said L-shaped supports for insertion of fasteners to engage said side bar.

13. The apparatus for assisting entry into vehicles as claimed in claim 7 wherein said L-shaped support comprises two L-shaped arms having a first generally vertical portion and a second generally horizontal portion and said horizontal portion angles outward relative to the axis of said first vertical portion on each arm.

14. An apparatus for assisting entry into vehicles comprising:
   a. A generally cylindrical side bar adapted for horizontal attachment to a vehicle wherein said bar is fixedly attached to a side of the vehicle along a longitudinal axis of the vehicle;
   b. A support and step assembly comprising a pair of planar L-shaped members attached to said side bar on a planar tab mounted perpendicular on said side bar at one of a plurality of mounting locations for variable axial generally vertical movement of said L-shaped members relative to said vehicle without additional support of said L-shaped support and step assembly from said vehicle;
   c. Said support and step assembly comprised of two vertical extensions with a plurality of engagement holes for stable engagement to said tab; and
   d. A step fixedly mounted to said vertical extensions.

15. The apparatus for assisting entry into vehicles as claimed in claim 14 further comprising a bracket for engaging said side bar to said vehicle.

16. The apparatus for assisting entry into vehicles as claimed in claim 14 further comprising a planar tab having a plurality of holes on said generally cylindrical side bar for fixedly attaching said support and step assembly.

17. The apparatus for assisting entry into vehicles as claimed in claim 14 wherein said support and step assembly comprises two L-shaped arms having a first upper generally vertical portion and a second generally horizontal portion.

18. The apparatus for assisting entry into vehicles as claimed in claim 17 wherein said horizontal portion angles outward relative to the axis of said first vertical portion.

19. The apparatus for assisting entry into vehicles as claimed in claim 14 wherein said support and step assembly comprises two L-shaped arms that for a Y-shape upon engagement to said vehicle.

20. The apparatus for assisting entry into vehicles as claimed in claim 14 further comprising a non-skid surface on said step.

\* \* \* \* \*